United States Patent [19]

Coste

[11] Patent Number: 5,396,961
[45] Date of Patent: Mar. 14, 1995

[54] PLOUGH FRAME COMPRISING AT LEAST ONE BODY HAVING A PLOUGH BOARD AND A SINGLE PLOUGHSHARE ACTING IN BOTH PLOUGHING DIRECTIONS

[76] Inventor: Jean-Louis Coste, 2 allé du Pressoir, 77400 Saint-Thibault Des Vignes, France

[21] Appl. No.: 960,446
[22] PCT Filed: Apr. 23, 1991
[86] PCT No.: PCT/FR91/00336
§ 371 Date: Dec. 22, 1992
§ 102(e) Date: Dec. 22, 1992
[87] PCT Pub. No.: WO91/15942
PCT Pub. Date: Oct. 31, 1991

[30] Foreign Application Priority Data

Apr. 23, 1990 [FR] France ................... 90 05149
Oct. 1, 1990 [FR] France ................... 90 12072

[51] Int. Cl.⁶ .............................................. A01B 3/40
[52] U.S. Cl. .............................................. 172/219
[58] Field of Search ............... 172/218, 219, 220, 221, 172/222, 223

[56] References Cited

U.S. PATENT DOCUMENTS 4,036,305  7/1977  Kinzenbaw ................ 172/218 X
4,800,963  1/1989  Gomez ....................... 172/219
5,199,503  4/1993  Matsepuro et al. ......... 172/221

FOREIGN PATENT DOCUMENTS 8801129  2/1988  European Pat. Off. .
2583950  1/1987  France .
2635635  3/1990  France .
110313   4/1900  Germany ................... 172/218

Primary Examiner—Clifford D. Crowder
Assistant Examiner—Paul C. Lewis
Attorney, Agent, or Firm—Panitch Schwarze Jacobs & Nadel

[57] ABSTRACT

A plough frame designed to be hitched to a tractor and comprising at least one body which has a plough board and a single ploughshare for both the right and left ploughing directions, said frame consisting of a coupler head (1), hinged elements which swing relative to said head and include: a body support beam (5) provided with body support pivots (19), at least one bracket element (6) swiveling both around a point (3) with the head (1) and around a point (8) with the body support beam (5) so that this beam can pass either side of a line running through said points (3 and 8), and at least one activating device (16) for moving the body support beam (5) and allowing different ploughing widths to be achieved.

12 Claims, 5 Drawing Sheets

PLOUGH FRAME COMPRISING AT LEAST ONE BODY HAVING A PLOUGH BOARD AND A SINGLE PLOUGHSHARE ACTING IN BOTH PLOUGHING DIRECTIONS

BACKGROUND OF THE INVENTION

This invention concerns a plough frame comprising at least one body having a plough board and a single symmetrical ploughshare, acting in both ploughing directions, left and right, designed to be hitched to a tractor. The principle is known of variable width for single ploughs and wheel ploughs, achieved by various articulated quadrilaterals which, because of their purpose and asymmetrical designs cannot be applied to the principle of the symmetrical body plough for acting in both ploughing directions. Also, the position of the pivot of the body the farthest forward, taken with respect to the direction of forward movement, is independent of the position of the different articulation axes of the deformable quadrilateral. The principle is known of the symmetrical body plough according to patent FR-A-2635635 by which the different ploughing widths in both ploughing directions are achieved by a bracket arm, one of its ends oscillating on both sides of the vertical longitudinal plane of symmetry of the head, around a first axis of the head located in a vertical plane of the head, and by the other end receiving by a second axis the body support beam which also oscillates with respect to the bracket arm on both sides of the vertical plane passing through the two axes.

Also known from the same patent and from application FR 8905192 is the principle of variable width: the change of the forward body support beam from one ploughing direction to the other and the continuous positions of ploughing width achieved by the means provided by the invention of a ramp of various shapes necessarily participating in its guidance, the angle that the beam makes with the bracket arm varying throughout the movement of the beam at the different widths for the same depth of ploughing.

Although this type of plough overall represents a large reduction in weight and price compared to the principle of the reversible plough, double acting left and right body, the head of the symmetrical body plough is elaborate and bulky: the ramp or its support having to be large enough which depends on the perpendicularity of the plough when the tractor is in the ridge between furrows and the fact that they must achieve both directions of ploughing, it follows that there is a certain weight and cost of manufacturing. Such a principle for the frame is limited to ploughs with a small number of bodies, the movement of the beam from a point on the guide rod to the central point, only being able to be achieved simply if its support arm has its rear pivot located in the maximum ploughing width position, on the same side of the longitudinal plane of symmetry as the forward-most body, and is not far from said body, which, because of cantilevering, makes any beam weak that supports the bodies positioned thereon behind said pivot, and all the more so when the number of bodies is high.

SUMMARY OF THE INVENTION

Briefly stated, the present invention is a plough frame for being hitched to a tractor (100). The frame consists of a coupler head (1) connected to the tractor (100) and hinged elements which are connected and swing relative to the coupler head (1), the hinged elements include a body support beam (5), a bracket (6), and means for movement.

The body support beam (5) is provided with regularly spaced body support pivots (19), each pivot (19) supporting a body (101) comprising a plough board (102) and a ploughshare (103) for both right and left ploughing directions, and an arm (13) connected to the body to control the orientation of the body. Each arm (13) engages the body support beam (5) at one end at pivot (19), each arm being parallel to one another, and each arm engages at a second end a single and common connecting member (15) to form a parallelogram (5/13/15/13). Thus, orientation of all the bodies (101) together is controlled through pivots (19).

The bracket (6) is hinged to support the beam (5), and is connected to the coupler head (1) at one end by a vertically-oriented axis (3) and connected at the other end to one end of the body support beam (5) by a vertically-oriented axis (8). Accordingly, the other end of beam (5) is proximate to the coupler head (1) and is rotatable around the axis (8) on both sides of a plane containing the vertical axis (3) and the vertical axis (8).

The means for movement include means (9) for moving the connecting member (15) in order to rotate the pivots (19) which orient the bodies, means (16) for moving the bracket (6) around the axis (3), and means (25) for moving the beam (5) around the axis (8). Means (9, 16, 25) are selected from the group consisting of springs or hydraulic jacks.

In the present invention, the distance between two adjacent pivots (19) along the beam (5) is A, the distance between the axis (8) and the axis (3) is A', and the distance between the axis (8) and the pivot (19) most proximate to the second end of the beam (15) is A'', and the distance A' is approximately equal to A+A'', the purpose of this invention being to correct the defects enumerated in the preceding paragraphs by adopting the following characteristics:

a simple means of achieving different ploughing widths at the body located farthest forward, the widths being approximately equal to those obtained at the other bodies by an activating device 9, ensuring the pivoting of the beam from one ploughing direction to the other by the intersection of the support beam 5 and bracket 6 around the axis 8 on both sides of the longitudinal axial plane of the bracket 6 and which is supported between the body support beam 5 and one of the elements of the head 1 and bracket 6 assembly, said device 9 being locked in ploughing position in such a way that the distance (h) between the line passing through the body support pivots 19 and a parallel line passing through point 3 is approximately constant for a given ploughing depth at different ploughing widths.

particularly when the tractor is rolling along one side in the preceding furrow, a distance between the point 3 and the point 8 which is approximately equal to: A', the distance A between two body support pivots 19 added to the distance A between the body support pivot 19 closest to point 3 on the one hand, and the point 8 on the other hand, and a distance A between the point 3 and the pivot 19 of the body support located farthest forward positioned behind said point 3 (inversely if the plough is placed in front of the tractor) which is approximately equal to the distance between two consecutive body pivots.

a locking mechanism 47, according to a special form of the invention composed of a sliding member 4 (as seen in FIGS. 2 and 2 bis), receiving support between the beam 5 at a point 7 and one of the head 1 and bracket 6 elements at a point 2, and which is connected to a supply source in such a way as to release the device 9 in return phase and lock it in ploughing phase.

a means, adjustable by stops, for orienting the body support pivots 19, which stops are connected to some of the arms 13 of the articulated parallelogram 5/13/15/13 by keeping them parallel to themselves in one direction and causing them to pivot from one ploughing direction to the other, comprising:

either an arm 20 parallel to the bracket 6 and hinged by an arm 46 with the point 8 and by another arm 45 with the point 3, forming a hinged parallelogram, and an activating mechanism 25 of the arm 45 receiving support form the head 1, the arm 46 being connected to an arm 13 hinged at point 8, or an arm 20 parallel to the bracket 6 hinged with the head 1 and by an arm 46 with the point 8, forming a hinged parallelogram, and an activating mechanism 25 of an arm 13 hinged with point 8, receiving support from the arm 46.

The locking of elements 5 and 6 by device 9 requires a parallelogram-type articulated link connected to a fixed point on the head, or else the beam when pivoting will draw along the body rigidly connected to it when there is a change of angle, which makes this means of making the bodies of device 9 indissociable.

a means for maintaining the orientation of the beam 5 in order to obtain the same ploughing width depending on the depth of ploughing and the different distances between the tires of the tractor, or inversely particularly when the tractor is moving on one side along the ridge of the preceding furrow, by varying:

the angle between the head 1 and all of the articulated elements 4/5/6 by an activating mechanism 16 held between the head and one of the articulated elements (4/5/6) with respect to the head.

the distance (h) by changing the angle made between the bracket arm 6 and the beam 5 by the activating device 9 and locking mechanism 47 interposed between them, or according to a preferred form of the invention by an arm 4 which pivots at two of its points, on the one hand with the beam 5 by an axis in one of its points 7, and on the other hand, around an axis 2 located on one of the elements 1 and 6, which arm 4 has a sliding part with one stop 31 limiting the distance between the axes 2 and 7.

another means of placing the beam in different positions parallel to the same direction by moving at least one of the axes 3 of element 6 of the elements 4/5/6 on both sides of the longitudinal plane of symmetry during a change from one ploughing direction to another by a means of guidance between the head 1 and the elements 4/5/6 connected to it, and by an activating mechanism being supported between the head 1 and said elements, this form not being represented in the drawings.

a means of guiding the beam 5 by its front connected, by an arm 4 of fixed length, to one of the head 1 elements and bracket 6 at a point 2, which, according to a preferred form of the invention, may be identical with the axis 3, the bracket arm 6 being composed of an extensible means varying the distance between the axes 3 and 8, comprised, according to a particular form of the invention, of two elements 10 and 11 hinged between them by an axis.

a means to guide and support the beam 5 on a guide rod 17 attached to the head 1, said guide rod having the shape of a portion of circumference, positioned between the axis 3 and the axis 8, having the axis 3 as the approximate center, which means represents an option to the means previously described.

a means of preselecting the ploughing widths by the arrangement of at least one set of right and left stops 18 positioned on the head in order to alternately stop for each direction of ploughing, at least one of the elements 6 oscillating around an axis of the head.

a means of carrying and guiding the hinged elements on the head and those with respect to it comprised of a hinged support wheel 36 characterized by the fact that the pivoting of the wheel from one direction of ploughing to the other is achieved by an arm 38, hinged on the one hand with element 15 of the elements 5/13/15/13 of one of the hinged parallelograms and on the other hand to an arm 38 rigidly attached to said wheel, an activating mechanism 16 being supported by it.

according to preferred forms of the invention at least one of the devices 9 and 47 as well as the bracket 6 are hinged with the head 1 in the longitudinal plane of symmetry.

BRIEF DESCRIPTION OF THE DRAWINGS

This invention will be better understood after reading the following description, concerning several forms of particular, non-limitative realizations of this invention and being based on the drawings where.

DETAILED DESCRIPTION OF PREFERRED EMBODIMENTS

Figure 1:
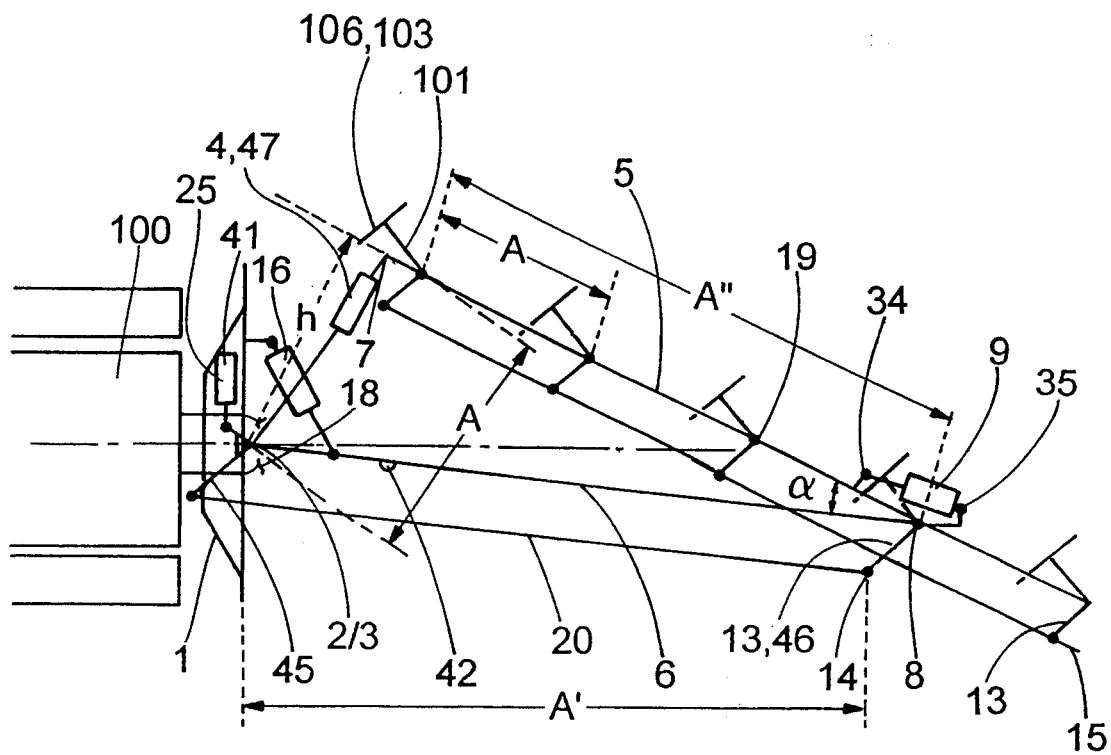
FIG. 1 is a diagrammatic plan view of a plough frame, according to a first embodiment of the present invention, comprising a coupler head 1, a bracket 6 hinged to said head by an axis 3, and a pivot support beam 5 having a plurality of pivots 19 and hinged to said bracket by an axis 8.
Figure 1A:
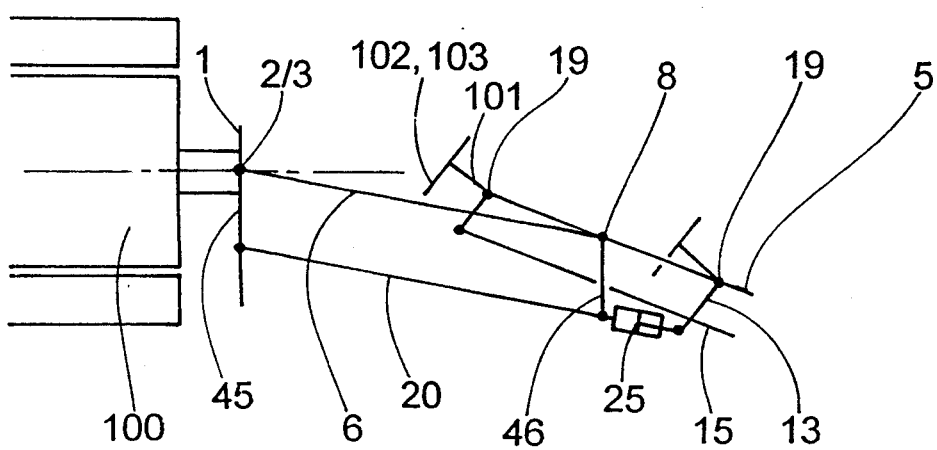
FIG. 1A is a diagrammatic plan view of a second embodiment of the present invention, where the activating means 25 is connected between the arm 46 and the connecting member 15 in order to orient the pivots 19.

In the drawings, like numerals are used to indicate like elements throughout. FIG. 1 is comprised of a coupler head 1 on which an axis 3, situated on its vertical plane of symmetry according to a preferred form of the invention, receives an bracket element 6 on which in an axis 8 a beam element 5 pivots in an area father from the head 1, behind the axis 3, a hydraulic activation mechanism 16 being supported by its ends on the head 1 and on bracket 6. Regularly spaced body support pivots 19 are located on the beam 5. Each pivot 19 has an articulated arm 13 attached rigidly thereto. Another arm 15 parallel to the beam 5 connects the arms 13 to form an articulated parallelogram 5/13/15/13,. As can be seen, one arm 13 does not control a body support pivot 19 and instead is hinged with axis 8. An adjustable locking device 47 comprised of hydraulic locks limits the travel of an activating device 9 interposed between bracket 6 at point 35 and between beam 5 at point 34 in such a way that the distance h between a line passing through the body support pivots 19 and a parallel line passing through point 3 is approximately constant, when the locking device 47 locks the action of 9, for a given depth of ploughing at different ploughing widths.

An arm 20 parallel to the bracket element 6 is hinged with the axis 3 by an element 45 and with the axis 8 by an element 46 to form a second articulated parallelogram 6/45/20/46. An activating device 25 is supported at element 45, and on the head at a point 41. The two parallelograms are connected to each other by the arms 46 and 13 so that the action of 25 is transmitted to the body support pivots 19.

According to the preferred form of the invention shown in FIG. 1-bis, the activating device 25 receives support between the axis 8 and the element 13, and the arm 20 is hinged directly on the head. Thus, the element 45 is no longer necessary. These two combined arrangements of the activating mechanism 25 and the two parallelograms have three objectives:

- to hold the bodies in the same orientation with respect to the forward movement during the continuous oscillation of elements 5 and 6 around the head 1, covering the various ploughing widths in the left and right ranges;
- to cause the body supports 19 to pivot for the change from one ploughing direction to another;
- to correct the "point slope" by a stopping device.

To adjust, according to special forms of the invention, with more accuracy the width at the first body: the distance A' from the point 3 to the point 8 is approximately equal to the distance A between two body support pivots 19 plus the distance A between the body support pivot 19 closest to the axis 3 and the point 8. Note that the distance A is also approximately equal to the distance from the axis 3 to the axis of the body support pivot 19, axis 3,. The combination, according to the invention of, beam 5 which oscillates with respect to the head 1 by the mechanism 16 and distance A', holds the bodies in the same direction, and the locking of the device 9 leads to, without having to adjust elements between themselves during the oscillation, achieving in each position of the beam a ploughing width at the first body that is approximately equal to that which is obtained at each body, by a variation of width approximately proportional between them of the points of the body support beam 5.

According to a form of the invention not represented, the preceding result can be obtained by maintaining the orientation of the bodies by adjusting an activating device of the parallelogram 5/13/15/13 being supported on the beam 5.

At the end of the ploughing furrow, three activating devices are activated, after release of the activating device 9 by unlocking 47:

- 9 which causes the beam 5 to pivot on both sides of the line 3–8 of the bracket element 6 by rotation around the axis 8;
- 16 which causes the bracket 6 to rotate on both sides of the head 1 around the axis 3 to place the bracket 6 in the opposite range of ploughing width;
- 25 which causes the body supports 19 to pivot in the other ploughing direction.

The right and left stops 18 attached to the head and into which the bracket arm 6 comes into contact are used either to limit the expected maximum ploughing width ranges or to predetermine the selected fixed width.

Figure 2:
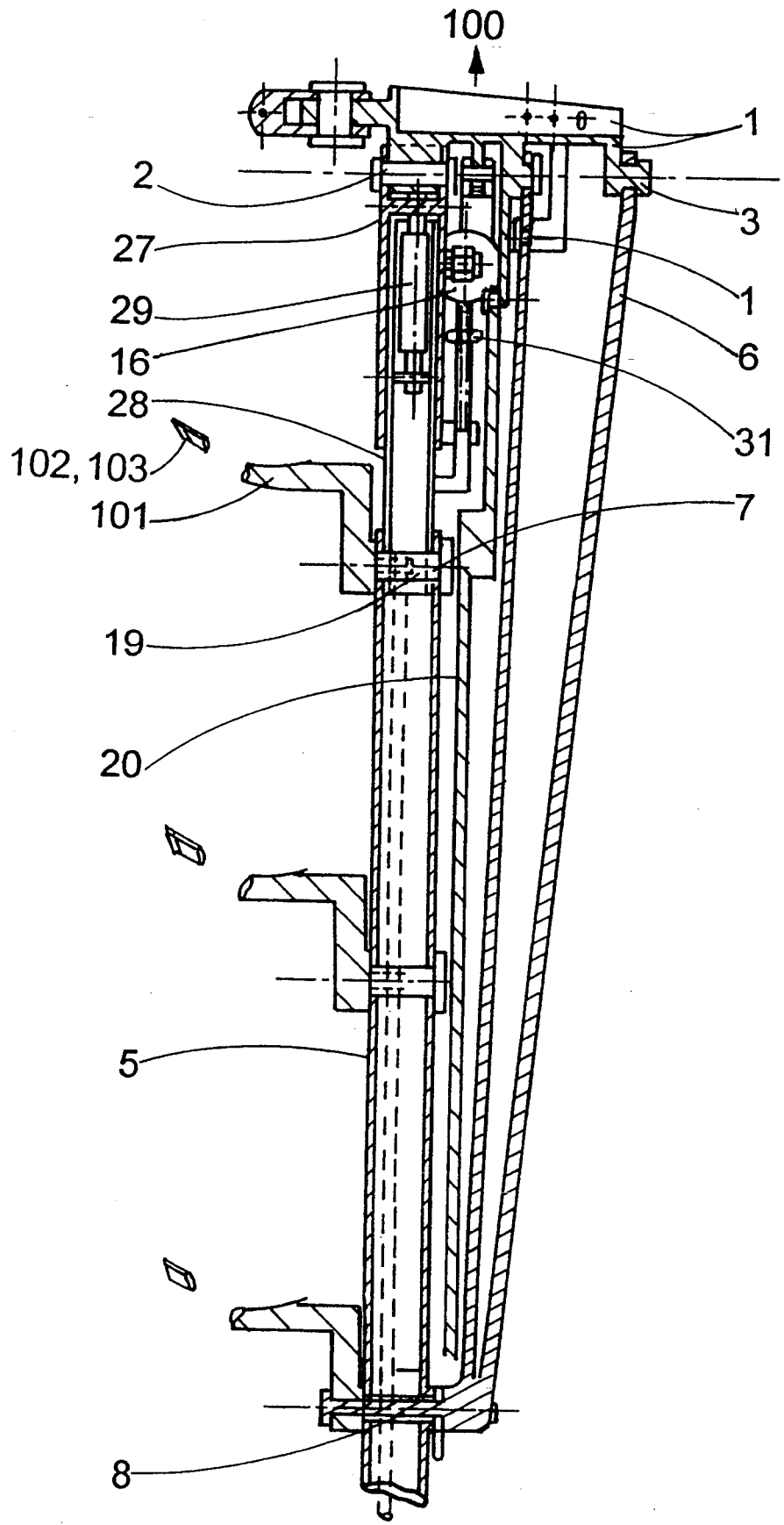
FIG. 2 is a perspective view of the first embodiment of the present invention wherein the right side is shown, the front side of the plough frame being defined as including the coupler head 1.
Figure 2A:
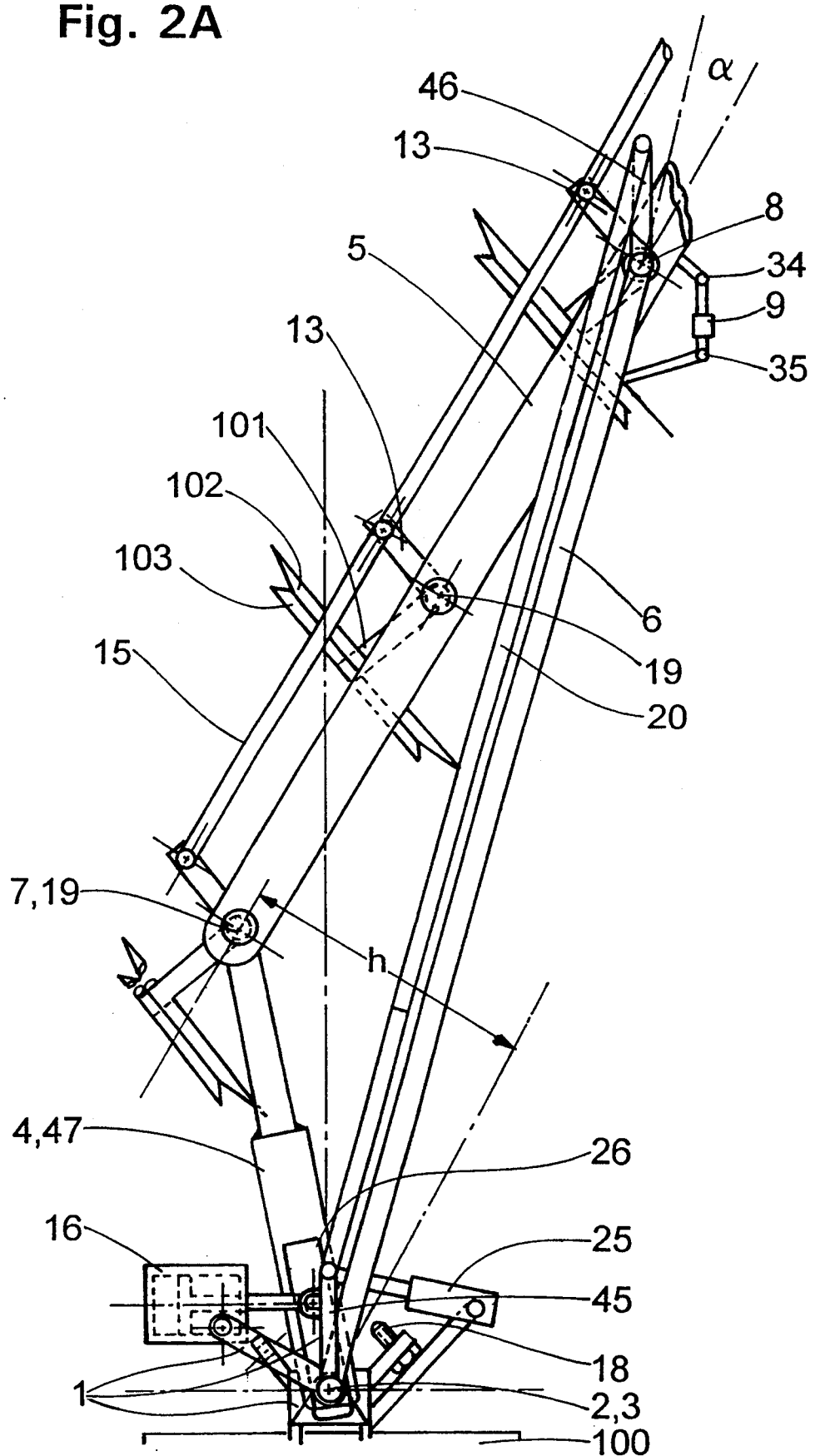
FIG. 2A is a plan view of the plough frame shown in FIG. 2.

FIG. 2 shows the same plough frame as depicted in FIG. 1 and uses the same reference numbers for the same elements. The locking device 47 here named 4 is hinged on the beam 5 at point 7 and at point 2 on either the bracket 6 or the head 1. In the latter case, and according to a preferred form of the invention, the point 2 is a vertical axis, located on the longitudinal plane of symmetry of the plough. The position of the axis 2 is such that the pivoting of the three elements 4,5,6 around the axis 3 maintains approximately constant the angel alpha ($\alpha$) formed by 5 and 6 at 8, in order to maintain the ploughing width of the body closest to the head, behind the axis 3, approximately equal to that which separates two consecutive bodies.

According to the preferred forms of the invention the device 4 is an element that can slide either by an opening 26 on the axis 2 or by two telescopic elements 27 and 28, combined with an elastic element 29. Each possibility includes limitation of the sliding by stop 31 and a sliding that allows, in changing from one direction of ploughing to the other, the alignment of the elements 4, 5 and 67. The hydraulic activating mechanism 16 in the case of FIG. 2 is supported between the head 1 and the device 4. According to special forms of the invention, the axes 2 and 3 can be merged and, right and left stops are used to limit the lateral course of the device 4. An adjustable stop 31, as seen in FIG. 2, is used to vary the distance (h) between the line passing through the body support pivots 19 and a parallel line passing through the axis 2/3, in order to obtain the same orientation of the beam 5 at different ploughing depths and/or different gauges between tires.

Figure 3:
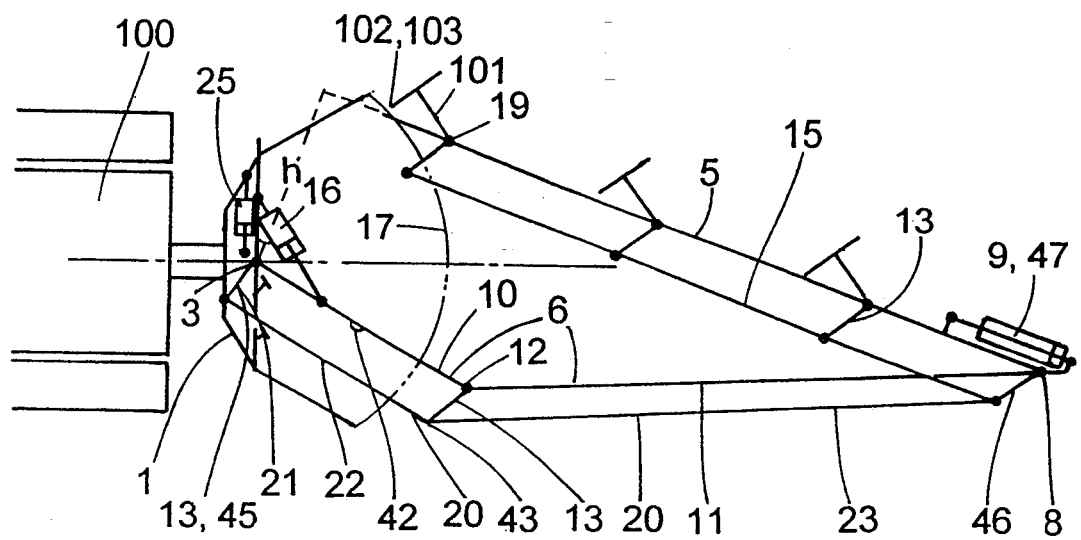
FIG. 3 is a diagrammatic plan view of a third embodiment of the present invention, where the bracket 6 is articulated in at least two elements 10 and 11 and where the locking means 4, 47 are replaced by a circular support guide 17 and a lock 47 for the beam 5.

FIG. 3 bears the same reference numbers for the same elements. The bracket 6, according to a preferred form of the invention, comprises an extensible device between the axes 3 and 8 and according to a more particular form this extensible device is composed of two elements 10 and 11 hinged at 12. The element 20 if it is used in combination with the element 6 is also broken down into two hinged elements 22 and 23 hinged at 43. 12 and 43 are joined by an arm parallel and equal in length to the arms 45 and 46. The units 10/22, 11/23 form a train of two hinged parallelograms. A circular-shaped sector 17 is attached to the head behind the axis 3. The extensible device has an extension between the axis 3 and the axis 8 which is appreciably greater than the length of the element 4 added to the distance between the point of articulation between 4 and 5 and the axis 8 in order to allow the alignment of 5 and 6 when changing from one direction of ploughing to another.

The phases of operation are otherwise similar to the frame shown in FIGS. 1, 2 and 2 bis.

Figure 4:
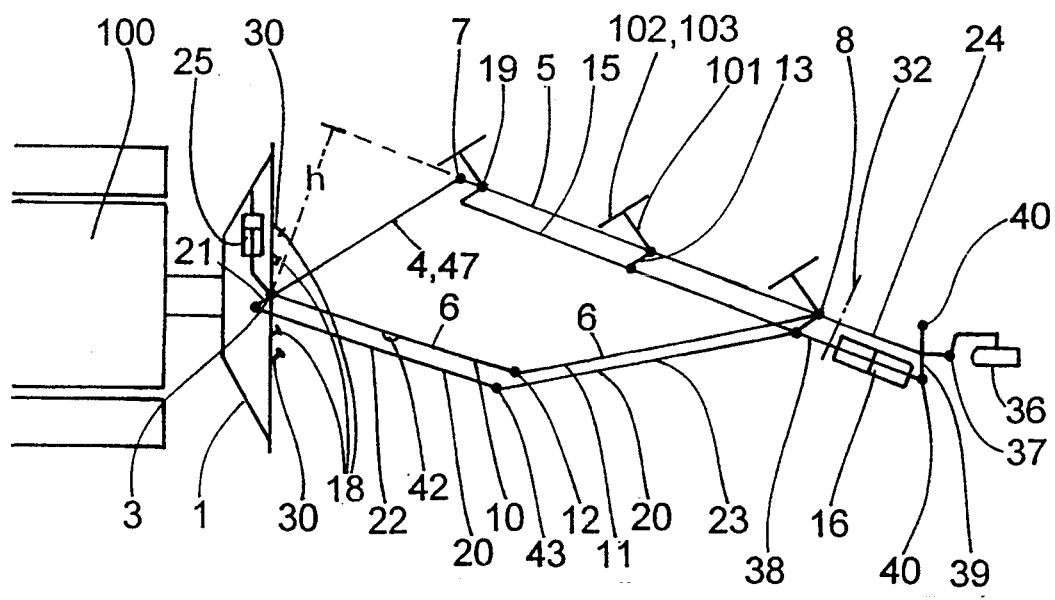
FIG. 4 is a diagrammatic plan view of a fourth embodiment of the present invention, where the bracket 6 is articulated in at least two elements 10 and 11 and where the means 16 cooperates with the wheel 36 so that means 9 is not necessary.
Figure 5:
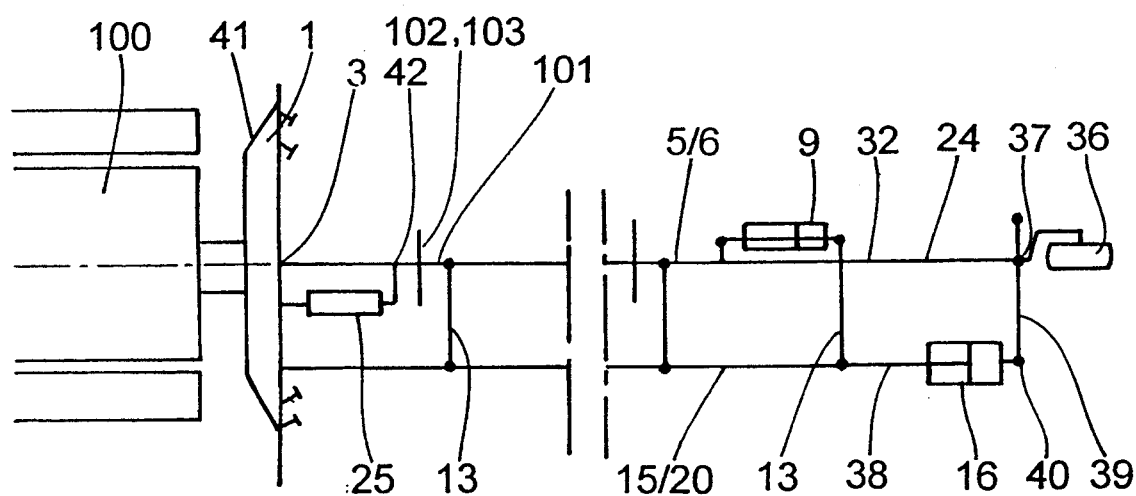
FIG. 5 is a diagrammatic plan view of the frame shown in FIG. 4, where the beam 5 is moved directly under the support bracket 6 to transport the frame.

FIG. 4 represents a fourth embodiment of the present invention wherein the guide arm 4 replaces the circular sector 17 shown in FIG. 3. The frame is also equipped with a support wheel 36, supported by an extension 24 extending rearwardly from the beam 5. The wheel is attached to the extension 24 by a pivot 37 to which an arm 39 is rigidly connected. The activating device 16 is interposed between the arm 39 and a connecting art 38 which is in turn connected to the connecting member 15.

According to a preferred form of the invention the arm 20 is disengaged from the head 1 and be connected to the bracket 6 in such a way as to immobilize the elements 13/15 with respect to 5, and to free the articulation of the elements around the axis 2/3 with respect to the head. An activating device, placed between one of the elements 13/15 and the arm 39 causes the change of ploughing width by inducing the assembly 6/5 to pivot around the head by changing the angle between the body support pivot 19 and 5, and also causes the repositioning of the wheel 36. The activating device 16 placed at the back allows the position to be reversed with respect to beam from one direction of ploughing to the other.

I claim:

1. A plough frame for being hitched to a tractor (100) said frame consisting of a coupler head (1) for connecting to the tractor (100) and hinged elements which are connected and swing relative to said coupler head (1), the hinged elements including:
    a body support beam (5) having first and second ends and being provided with regularly spaced body support pivots (19), each pivot (19) supporting a body (101) comprising a plough board (102) and a ploughshare (103) for both right and left ploughing directions, and an arm (13) connected to each of said bodies to control the orientation of each of said bodies, each of said arms (13) engaging the body support beam (5) at a first end at a pivot (19), the arms being parallel to one another, and each of said arms engaging at a second end a single and common connecting member (15) to form a parallelogram (5/13/15/13) and to control through the pivots (19) the orientation of all the bodies (101) together;
    a bracket (6) hinged to support the beam (5), connected to the coupler head (1) at a first end by a vertically-oriented axis (3) and connected to the first end of the body support beam (5) at a second end by a vertically-oriented axis (8), the second end of beam (5) being proximate to the coupler head (1) and being rotatable around the axis (8) on both sides of a plane containing the vertical axis (3) and the vertical axis (8); and
    means (25) for moving the connecting member (15) in order to rotate the pivots (19) which orient the bodies, means (16) for moving the bracket (6) around the axis (3), and means (9) for moving the beam (5) around the axis (8);
    the distance between two adjacent pivots (19) along the beam (5) being A, the distance between the axis (8) and the axis (3) being A′, and the distance between the axis (8) and the pivot (19) most proximate to the second end of the beam (5) being A″, the distance A′ being approximately equal to A+A″.

2. A plough frame according to claim 1 wherein the means (9) for moving the connector member is locked in ploughing position by a locking device (47) supported between the beam (5) and an element selected from the group consisting of the head (1) and bracket (6) so that the distance h between a line passing through the body support pivots (19) and a parallel line passing through point (3) is approximately constant at different ploughing widths, the locking device (47) releasing the means (9) for moving the connecting member in return phase and locking the means (9) for moving the connecting member in ploughing phase.

3. Plough frame according to claim 1 wherein the locking device (47) comprises a sliding member (4) which is hinged on the beam at a third point (7) and at a fourth point (2) on an element selected from the bracket arm (6) and the head (1), the locking device (47) being connected to a supply source to release the device (9) in return phase and to lock the device (9) in ploughing phase.

4. Plough frame according to claim 1 wherein the means for orienting the body support pivots (19) by means of the elements (13/15) of the parallelogram (5/13/15/13) comprises an arm (20) parallel to the bracket (6) and connected thereto by arms (45, 46) to form an articulated parallelogram, and an activating device (25) supported on the arm (46) to pivot the body support pivots (19) from one direction of ploughing to the other.

5. Plough frame according to claim 1 wherein the means for orienting the elements (13/15) of the parallelogram (5/13/15/13) comprises an arm (20) parallel to the bracket (6) and hinged by an arm (46) with the axis (8) and by another arm (45) with the point (3), to form an articulated parallelogram, and an activating device (25) of the arm (45) being supported on the head (1), the arm (46) being connected to an arm (13) hinged with the axis to pivot the body support pivots (19) from one direction of ploughing to the other.

6. Plough frame according to claim 1 wherein an arm (4) is hinged at an axis (2) with the head (1), the bracket (6) comprising an extensible means between the axes (3) and (8).

7. Plough frame according to claim 6 wherein the axis (2) is merged with the axis (3).

8. Plough frame according to claim 1 wherein at least one set of right and left stops (18) is positioned on the head to stop for each ploughing direction the bracket (6) oscillating around a rigid axis of the head.

9. Plough frame according to claim 1 further comprising a pivotable support wheel (36) and an actuating device (19), wherein the pivoting of the wheel (36) from one direction of ploughing to the other is ensured by an arm (38), hinged with element (15) and to an arm (39) rigidly connected to said wheel, the activating device (19) being supported on the arm (39).

10. Plough frame according to claim 1 wherein at least one of the elements (4/5/6) moves on both sides of the longitudinal plane of symmetry when changing from one ploughing direction to the other by a guiding device between the head (1) and the elements (4/5/6) and by an activating device supported between the head (1) and said elements.

11. A plough frame according to claim 1, further comprising an angle α between the beam (5) and the bracket (6) at the vertical axis (8), the angle α being determined by the means (9) and being secured by securing means (47), the securing means (47) being released and the means (9) being adjusted during the turn at the end of a ploughing line to rotate the beam (5) across the vertical plane containing the vertical axis (3) and the vertical axis (8), and to orient the ploughshares, the angle α then being locked and secured in a symmetric position to plough in an opposite direction.

12. A plough frame according to claim 1, wherein the distance between the axis (3) and the pivot (19) most proximate to the second end of the beam (5) is approximately equal to distance A whatever is the distance wanted between two consecutive furrows, the distance between two consecutive furrows being controlled by rotation of the plough frame by bracket (6) around the axis (3) by means (16).

* * * * *